US012215716B2

(12) United States Patent
Czerwonka et al.

(10) Patent No.: US 12,215,716 B2
(45) Date of Patent: Feb. 4, 2025

(54) BLOWER

(71) Applicant: Milwaukee Electric Tool Corporation, Brookfield, WI (US)

(72) Inventors: Adam Czerwonka, Mukwonago, WI (US); Adam Ostrowski, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/618,349

(22) Filed: Mar. 27, 2024

(65) Prior Publication Data

US 2024/0328434 A1 Oct. 3, 2024

Related U.S. Application Data

(60) Provisional application No. 63/455,322, filed on Mar. 29, 2023.

(51) Int. Cl.

| | |
|---|---|
| ***F04D 29/66*** | (2006.01) |
| ***F04D 19/00*** | (2006.01) |
| ***F04D 19/02*** | (2006.01) |
| ***F04D 29/38*** | (2006.01) |

(52) U.S. Cl.

CPC ......... *F04D 29/667* (2013.01); *F04D 19/002* (2013.01); *F04D 19/007* (2013.01); *F04D 19/02* (2013.01); *F04D 19/028* (2013.01); *F04D 29/384* (2013.01); *F05D 2240/307* (2013.01)

(58) Field of Classification Search

CPC .... F04D 29/667; F04D 19/002; F04D 29/384; F05D 2240/307

See application file for complete search history.

(56) References Cited

U.S. PATENT DOCUMENTS

| | | | | |
|---|---|---|---|---|
| 4,981,414 | A * | 1/1991 | Sheets | F04D 29/68 415/149.1 |
| 5,437,539 | A * | 8/1995 | Gysling | F04D 15/0055 415/68 |
| 5,839,205 | A * | 11/1998 | Hung | F04D 17/165 417/423.5 |
| 5,894,630 | A | 4/1999 | Bitner et al. | |

(Continued)

FOREIGN PATENT DOCUMENTS

| | | |
|---|---|---|
| CN | 205934814 U | 2/2017 |
| CN | 110820657 A | 2/2020 |

(Continued)

*Primary Examiner* — Brian Christopher Delrue

(74) *Attorney, Agent, or Firm* — Dority & Manning, P.A.

(57) ABSTRACT

Blowers, e.g., for use in outdoor applications, are provided. A blower includes an air inlet; an air outlet; and a fan assembly disposed between the air inlet and the air outlet. The fan assembly has a three-stage fan. The three-stage fan includes three axial fans mounted on a drive shaft and three stator fans arranged in series with the axial fans, wherein each axial fan comprises a plurality of blades each having a blade tip. The three-stage fan has a dimensionless flow coefficient Φ in a range from about 0.3 to 0.5 as calculated by the equation $\Phi=(q/(A))/\omega R$ where q represents flow ($m^3/s$), A represents cross sectional area at the fan ($m^2$), ω represents speed (rad/s) and R represents fan tip radius (m) measured at a blade tip.

19 Claims, 5 Drawing Sheets

(56) References Cited

U.S. PATENT DOCUMENTS

| | | | | |
|---|---|---|---|---|
| 6,105,206 | A | 8/2000 | Tokumaru et al. | |
| 7,600,290 | B1 | 10/2009 | Peters | |
| 7,739,773 | B2 * | 6/2010 | Schliemann .......... | F04D 19/007<br>15/344 |
| 7,896,612 | B2 | 3/2011 | Schliemann et al. | |
| 8,894,382 | B2 | 11/2014 | Binder | |
| 9,737,182 | B2 | 8/2017 | Gindale et al. | |
| 10,107,292 | B2 | 10/2018 | Schäffler et al. | |
| 10,375,901 | B2 | 8/2019 | Burmudez et al. | |
| 10,674,681 | B2 | 6/2020 | Bermudez et al. | |
| 10,897,858 | B2 | 1/2021 | Hoffman et al. | |
| 10,947,983 | B2 * | 3/2021 | Hoffman ............... | F04D 29/329 |
| 11,067,087 | B2 * | 7/2021 | Tirone .................. | F04D 25/084 |
| 2004/0060274 | A1 | 4/2004 | Thomas et al. | |
| 2008/0089785 | A1 * | 4/2008 | Schliemann .......... | E01H 1/0809<br>415/208.1 |
| 2016/0195097 | A1 * | 7/2016 | Patrick ................ | F04D 29/5806<br>415/124.2 |
| 2018/0087513 | A1 * | 3/2018 | Hoffman ............... | F04D 19/002 |
| 2019/0211830 | A1 | 7/2019 | Liu et al. | |

FOREIGN PATENT DOCUMENTS

| | | | | |
|---|---|---|---|---|
| CN | 211368548 U | | 8/2020 | |
| CN | 213038278 U | | 4/2021 | |
| CN | 113586488 A | | 11/2021 | |
| CN | 216008954 U | | 3/2022 | |
| DE | 102007037011 | | 2/2008 | |
| EP | 2031208 A2 | * | 3/2009 | ................ F01P 5/02 |

* cited by examiner

BLOWER

CROSS-REFERENCE TO RELATED APPLICATIONS

The present application claims priority to U.S. Provisional Patent Application No. 63/455,322, filed on Mar. 29, 2023, the disclosure of which is incorporated by reference herein in its entirety.

FIELD

The present disclosure relates generally to blowers for use in outdoor applications, such as for blowing leaves and other debris. In particular, the present disclosure relates to blower having optimized efficiency and airflow gains.

BACKGROUND

Outdoor tools such as blowers are commonly used to concentrate debris, e.g., leaves, using a blowing function. Blowers being powered by a battery power source are particularly desirable due to their portability. However, optimization of the efficiency of a blower is necessary to improve runtime of the blower while maintaining performance, i.e., airflow rate, of the blower.

Accordingly, improved blower tools are desired in the art. In particular, a blower which provides optimized efficiency and airflow gains would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a blower is provided. The blower includes an air inlet; an air outlet; and a fan assembly disposed between the air inlet and the air outlet. The fan assembly has a three-stage fan. The three-stage fan includes three axial fans mounted on a drive shaft and three stator fans arranged in series with the axial fans, wherein each axial fan comprises a plurality of blades each having a blade tip. The three-stage fan has a dimensionless flow coefficient Φ in a range from about 0.3 to 0.5 as calculated by the equation $\Phi=(q/(A))/\omega R$ where q represents flow ($m^3/s$), A represents cross sectional area at the fan ($m^2$), ω represents speed (rad/s) and R represents fan tip radius (m) measured at a blade tip.

In accordance with another embodiment, an outdoor power tool is provided. The outdoor power tool includes a power head having a power head housing, a power source, a motor powered by the power source, and a drive shaft extending from the motor and rotatably driven by the motor. The power source and the motor are disposed within the power head housing, and the drive shaft extends from the power head housing. The outdoor power tool further includes a blower having a blower housing having an air inlet, an air outlet, and a fan assembly. The drive shaft of the power head extends into the blower housing and is configured to drive rotation of the fan assembly.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
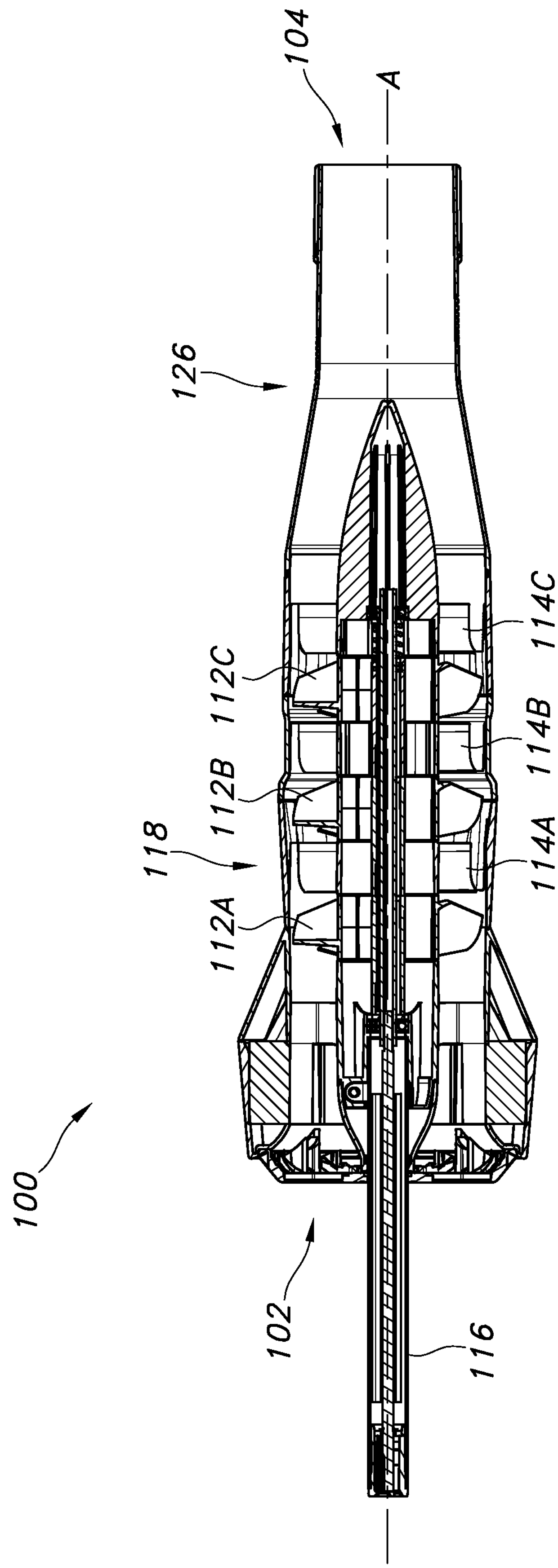
FIG. 1 is a side cross-sectional view of a blower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising." "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, the present invention is directed to a blower having optimized efficiency and airflow. The blower includes a three-stage fan assembly having three axial fans and three stator fans arranged in series. The size of the fan assembly may be optimized based on an ideal flow coefficient for the blower to optimize efficiency of the blower. The present invention is further directed to an outdoor power tool including a power head and a blower attachment removably coupled with the power head. The blower may be provided as a standard handheld blower having battery/electric power or gas power, or as a blower attachment, or in other configurations.

Referring now to the drawings, FIG. 1 illustrates a cross-sectional side view of a blower 100 as seen along a central axis A in accordance with an exemplary embodiment. The blower 100 is configured to generate airflow along an airflow conduit extending between an air inlet 102 and an air outlet 104 of the blower 100. The blower 100 may define a central axis A extending between the air inlet 102 and the air outlet 104. An outlet tube 106 can extend parallel with the central axis A.

As illustrated in FIG. 1, a blower housing 108 may at least partially enclose components of the blower 100 such as a fan assembly 110 including a plurality of axial fans 112, as well as various other components. Power to operate the fan assembly 110 may be provided by a suitable power source such as gas or one or more batteries (not shown). The blower 100 may be provided as a standard handheld blower having an electric (e.g., corded, or cordless battery powered) or gas power source, as a blower attachment couplable with a tool or power source, or in any other configurations.

The fan assembly 110 may be a three-stage fan. In other words, the fan assembly 110 may include three axial fans 112 and may further include three compressor stages. Each compressor stage is formed by a stator fan 114. Each stator fan 114 is disposed in series with each axial fan 112 along the central axis A to form a serial axial fan assembly as illustrated in FIG. 1.

A fan drive shaft 116 extends along axis A through a center of each axial fan 112 and stator fan 114 and rotatably drives the axial fans 112. The fan drive shaft 116 is coupled with a power head (see FIG. 5) that includes a motor and the power source, e.g., one or more batteries.

The blower housing 108 may have a multi-piece construction made from a plurality of body components coupled together to form the housing 108. For instance, the blower housing 108 may include a plurality of stackable housing segments 118 connected together in series to surround the fan assembly 110. Each stator fan 114 may be disposed in its own respective stackable housing segment 118. For instance, each stator fan 114 may be formed from a single piece construction with a respective stackable housing segment 118. A first stator fan 114 is disposed in first housing segment 118A, a second stator fan 114 is disposed in second housing segment 118B, and a third stator fan 114 is disposed in a third housing segment 118C. The stackable housing segments 118 further surround each of the axial fans 112 to enclose the fan assembly 110.

The stackable housing segments 118 each include one or more coupling features 120 configured to enable the stackable housing segments 118 to be stacked and fastened together. For instance, the coupling features 120 may protrude or extend from an outer surface 122 of each housing segment 118. The coupling features 120 may include but are not limited to one or more apertures or openings for receiving a fastener, e.g., screw, therethrough.

In one aspect, the housing segment nearest to the air outlet 104, i.e., the third housing segment 118C, may include an outlet cone 124 extending from the center of the third stator fan 114C in the direction of the air outlet 104 along the axis A. The outlet cone 124 may be formed from single piece construction with the third housing segment 118C and third stator fan 114C. The outlet cone 124 may guide a steady axial flow of air toward the air outlet 104 and lead to an improvement of the efficiency of the fan assembly 110.

An outlet tube 126 can be disposed downstream of the fan assembly 110 to guide air from the fan assembly 110 to the air outlet 104. The outlet tube 126 may be coupled with a downstream end of the third housing segment 118C. The outlet cone 124 may at least partially extend within the outlet tube 126.

Figure 2:
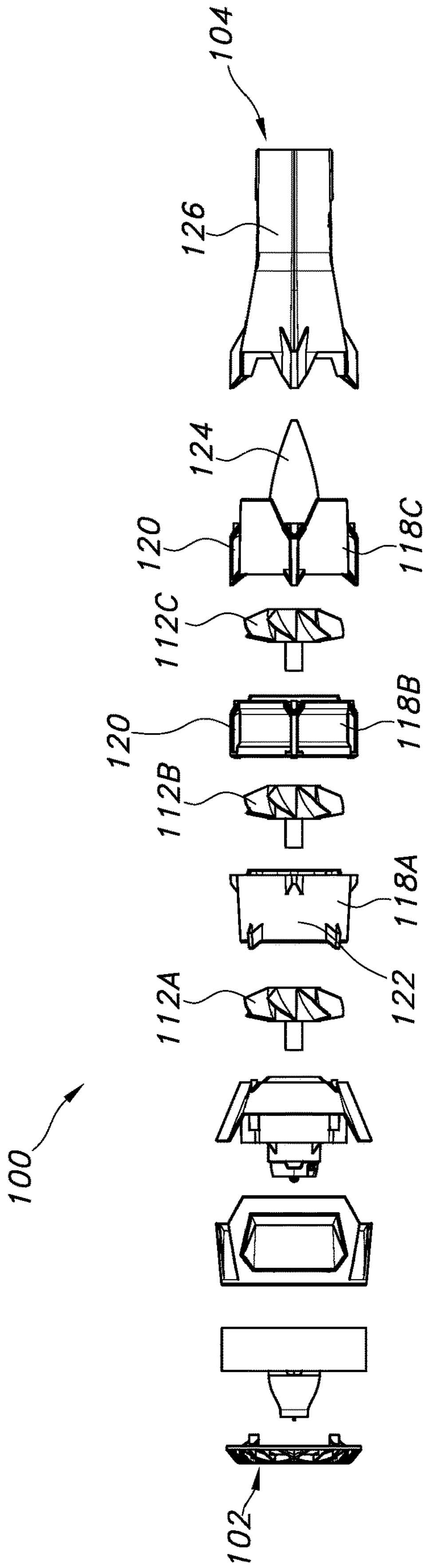
FIG. 2 is an exploded side view of a blower in accordance with embodiments of the present disclosure.
Figure 3:
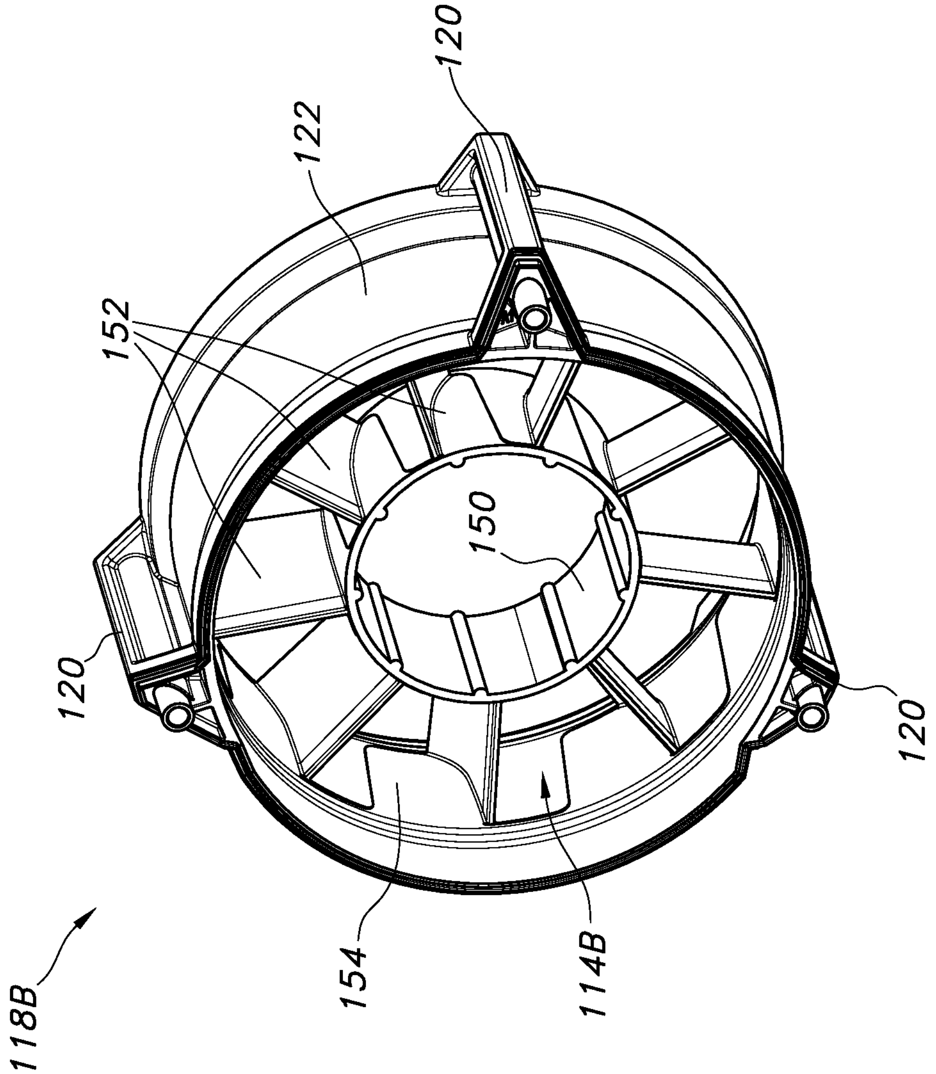
FIG. 3 is a perspective view of a housing segment of a blower including a stator fan in accordance with embodiments of the present disclosure.

FIG. 3 illustrates a perspective view of the second housing segment 118B and second stator fan 114B of FIG. 2. The stator fan 114B has a stator hub 150 and a plurality of stator blades 152. The stator hub 150 may have a diameter $D_{hub}$ having approximately a same diameter as a hub 130 of the axial fans 112 as described in further detail below. The stator blades 152 extend from the stator hub 150 to an inner surface 154 of the second housing segment 118B. The stator fan 114B may be illustrative of all three stator fans 114A, 114B, 114C. The outer surface 122 of the second housing segment 118B includes one or more of the coupling features 120 extending therefrom. For instance, three coupling features 120 may be provided about the circumference of the outer surface 122; however, any suitable number and arrangement of coupling features are contemplated by the present invention.

Figure 4:
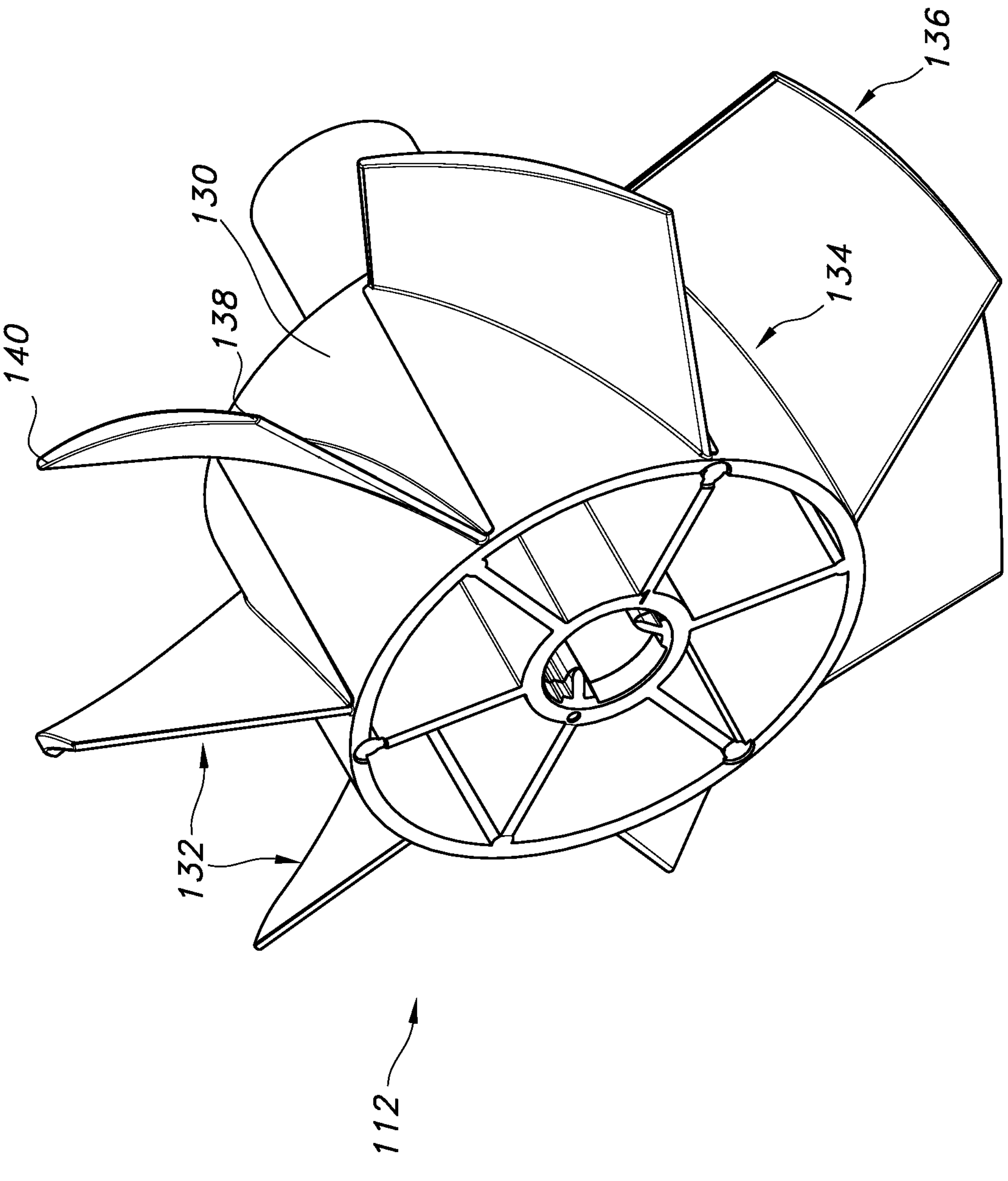
FIG. 4 is a perspective view of an axial fan of a blower in accordance with embodiments of the present disclosure.

Turning now to FIG. 4, the axial fans 112 will be described in further detail. Each axial fan 112 includes a circular hub 130 and a plurality of blades 132 extending outward from the hub 130 in a direction radially away from the central axis A. The hub 130 may have a diameter $D_{hub}$ in a range from about 55 mm to about 70 mm, for instance, about 63 mm.

The axial fan 112 additionally includes a drive shaft support 128 disposed radially inward from the hub 130 and configured to couple with the fan drive shaft 116. One or more supporting ribs 129 extend between the drive shaft support 128 and the hub 130 to connect the hub to the fan drive shaft 116 to enable transmission of rotation from the fan drive shaft 116 to the blades 132.

Each blade 132 extends radially outward from the hub 130 at a hub end 134 to a tip 136. The axial fan 112 may have a maximum diameter ($D_{tip}$) to the tip of the blades 132 in a range from about 100 mm to about 140 mm, such as from about 110 mm to about 130 mm, for instance, about 120 mm. Each blade 132 extends axially along the hub 130 from a blade inlet side 138 disposed nearer to the air inlet 102 to a blade outlet side 140 nearer to the air outlet 104. The blades each have a chord length C extending from the blade inlet side to the blade outlet side along the axial length of the hub 130. The chord length C of each blade 132 may be in a range from about 30 mm to about 50 mm, for instance, about 40 mm.

Each blade 132 may have a different angle at the blade inlet side 138 and the blade outlet side 140. More particularly, an angle at the blade inlet side 138 at the hub (referred to as θ_hub,in or blade hub inlet angle) may vary from an angle at the blade inlet side 138 of the tip 136 (referred to as θ_tip,in or blade tip inlet angle). Similarly, an angle at the blade outlet side 140 at the hub (referred to as θ_hub,out or blade hub outlet angle) may vary from an angle at the blade outlet side 140 of the tip 136 (referred to as θ_tip,out or blade tip outlet angle).

The angle of each blade 132 at the blade inlet side 138 may be greater than the angle of each blade 132 at the blade outlet side 140. Moreover, the angle of each blade 132 at the tip 136 may be larger than the angle at the hub end 134 at any given location along the length of the blade 132.

In an embodiment, the angle at the blade inlet side 138 at the hub (θ_hub,in) may be in a range from about 40 degrees to about 55 degrees, for instance, about 47 degrees. The angle at the blade outlet side 140 at the hub (θ_hub,out) may be in a range from about 20 degrees to about 30 degrees, for instance, about 26 degrees. The blade inlet side 138 of the tip 136 (θ_tip,in) may be in a range from about 58 degrees to about 70 degrees, for instance, about 64 degrees. The angle at the blade outlet side 140 of the tip 136 (θ_tip,out) may be in a range from about 50 degrees to about 55 degrees, for instance, about 52 degrees.

As illustrated in FIG. X, in one aspect, the axial fan 112 may have seven (7) blades 132. However, the present inventors contemplate any desired number of fan blades 132 as necessary to achieve desired air flow characteristics.

The present inventors have found that the fan assembly 110 of the present invention having a three-stage axial fan is optimized when the dimensionless flow coefficient Φ is in a range from about 0.3 to about 0.5. The size and speed of the fan assembly 110 are defined as a function of the optimal flow coefficient Φ. The flow coefficient is calculated by the following equation:

$$\Phi = \frac{q/(A)}{\omega R}$$

where q represents flow ($m^3/s$), A represents cross sectional area at the fan ($m^2$), ω represents speed (rad/sec) and R represents fan tip radius (meters) measured at a blade tip 136. Stated differently, the numerator q/(A) is the axial velocity at the fan (meters per second).

Based on the calculation of the flow coefficient Φ as shown above, the optimal size of the fan can be determined by rearranging the equation as shown below:

$$R = \frac{q/(A)}{\omega \Phi_{ideal}}$$

In one aspect of the present invention, a fan assembly 110 may be provided with three axial fans 112 having the following fan dimensions:

| | |
|---|---|
| $D_{hub}$ | 62.8 mm |
| $D_{tip}$ | 119.0 mm |
| θ_hub, in | 47.2° |
| θ_hub, out | 25.7° |
| θ_tip, in | 64.1° |
| θ_tip, out | 52° |
| C | 39.9 mm |
| Number of blades | 7 |

Figure 5:
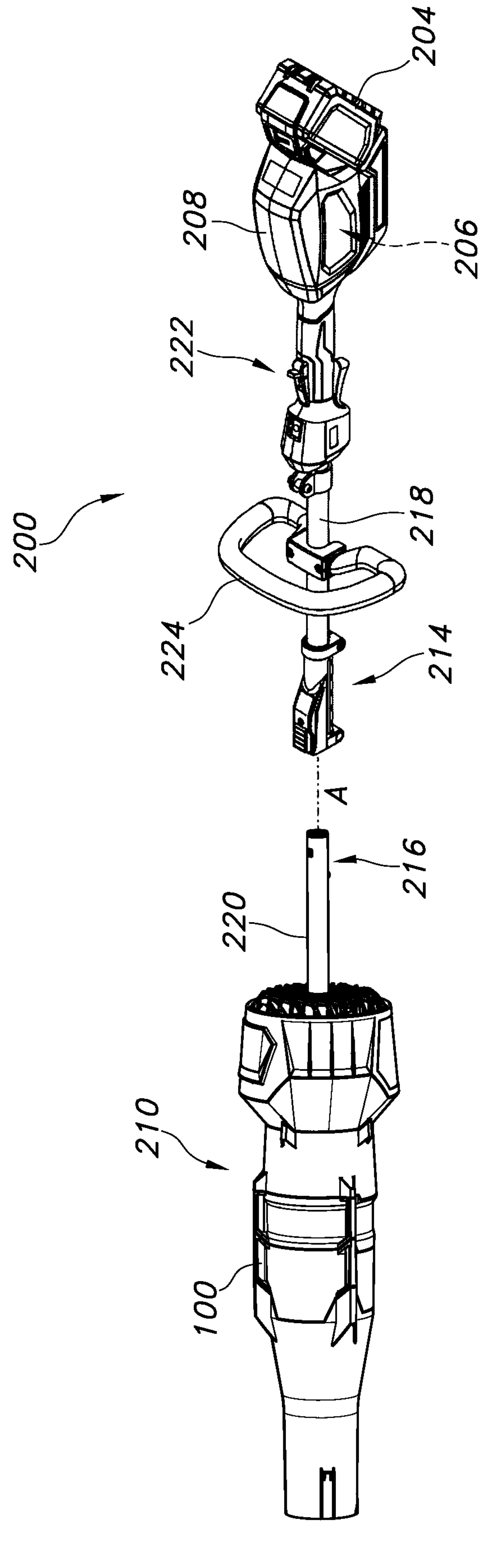
FIG. 5 is a side perspective view of an outdoor power tool in accordance with embodiments of the present disclosure.

Turning now to FIG. 5, an outdoor power tool 200 in accordance with an exemplary embodiment is shown. The outdoor power tool 200 includes a tool attachment 210, e.g., the blower 100, and a power head 202. The power head 202 includes a power source 204, e.g., a battery, and a motor 206. The power source 204 and motor 206 may be disposed in a power head housing 208. The motor 206 is powered by the power source 204. When powered by the power source 204, rotation of the motor 206 is configured to rotatably drive a drive shaft 212.

The power head drive shaft 212 is configured to extend from the power head housing 208. The power head drive shaft 212 may be disposed within an outer protective shaft 218. The power head drive shaft 212 and/or the outer protective shaft 218 may include one or more coupling features 214 configured to couple to a receiver 216 of the tool 210. The outer protective shaft 218 may further include a user input 222, e.g., a power switch, configured to control operation of the power head 202, and a handle 224 configured to be grasped by a user.

In one aspect, the tool 210 may be the blower 100 as described herein. The receiver 216 may be coupled with the fan drive shaft 116 of the blower 100. The coupling features 214 of the power head drive shaft 212 may be coupled or fastened with the receiver 216 of the blower 100 such that the power head drive shaft 212 and the fan drive shaft 116 are coupled together. For instance, when coupled, the power head drive shaft 212 and the fan drive shaft 116 may extend coaxially along the axis A. Rotation of the power head drive shaft 212 may be transmitted to the fan drive shaft 116 to cause rotation of the axial fans 112 of the blower 100.

Optionally, the receiver 216 may be provided on a blower outer protective shaft 220 through which the fan drive shaft 116 may extend to couple with the power head drive shaft 212. The outer protective shaft 218 of the power head 202 and the blower outer protective shaft 220 may be provided to enhance the safety of the outdoor power tool 200 by enclosing the rotating drive shaft elements to prevent a user or bystander from contacting the rotating drive shaft elements.

While FIG. 5 illustrates the blower 100 as the tool attachment 210 coupled with the power head 202 to form the outdoor power tool 200, the tool attachment 210 may be any desirable outdoor tool that is selectively and removably coupled to the power head 202, including but not limited to a string trimmer attachment, an edger attachment, a hedge trimmer attachment, a pole saw attachment, a brush cutter attachment, a broom attachment, a brush attachment, a cultivator attachment, or the like. Moreover, the outdoor power tool 200 may be provided with a plurality of additional tool attachments 210 to form a kit of interchangeable tools usable with the power head 202.

Further aspects of the invention are provided by one or more of the following embodiments:

A blower includes an air inlet; an air outlet; and a fan assembly disposed between the air inlet and the air outlet. The fan assembly has a three-stage fan. The three-stage fan includes three axial fans mounted on a drive shaft and three stator fans arranged in series with the axial fans, wherein each axial fan comprises a plurality of blades each having a blade tip. The three-stage fan has a dimensionless flow coefficient Φ in a range from about 0.3 to 0.5 as calculated by the equation $\Phi=(q/(A))/\omega R$ where q represents flow ($m^3/s$), A represents cross sectional area at the fan ($m^2$), ω represents speed (rad/s) and R represents fan tip radius (m) measured at a blade tip.

A blower of any one or more of the embodiments, wherein each stator fan comprises a stackable housing, wherein each of the stackable housings of the three stator fans are coupled together in series to form a blower housing, wherein the blower housing houses the three stator fans and the three axial fans.

A blower of any one or more of the embodiments, wherein the blower housing comprises a diameter less than about 140 mm.

A blower of any one or more of the embodiments, wherein each axial fan comprises a hub surrounding the drive shaft, wherein the hub comprises a diameter in a range from about 50 mm to about 75 mm.

A blower of any one or more of the embodiments, wherein each of the plurality of blades of each axial fan extends from the respective hub of each axial fan to each respective blade tip, wherein each axial fan comprises a maximum diameter in a range from about 100 mm to about 140 mm.

A blower of any one or more of the embodiments, wherein the maximum diameter of each axial fan is in a range from about 115 mm to about 125 mm.

A blower of any one or more of the embodiments, wherein each blade comprises a chord length from an inlet side of the blade to an outlet side of the blade in a range from about 30 mm to about 50 mm.

A blower of any one or more of the embodiments, wherein the chord length is in a range from about 35 mm to about 45 mm.

A blower of any one or more of the embodiments, further wherein a blade hub inlet angle at the hub is greater than a blade hub outlet angle of each blade at the hub.

A blower of any one or more of the embodiments, wherein the blade hub inlet angle is in a range from about 40 degrees to about 55 degrees.

A blower of any one or more of the embodiments, wherein the blade hub outlet angle is in a range from about 20 degrees to about 30 degrees.

A blower of any one or more of the embodiments, wherein a blade tip inlet angle at the inlet side of the blade tip is greater than a blade tip outlet angle at the outlet side of the blade tip.

A blower of any one or more of the embodiments, wherein the blade tip inlet angle is in a range from about 58 degrees to about 70 degrees.

A blower of any one or more of the embodiments, wherein the blade tip outlet angle is in a range from about 50 degrees to about 55 degrees.

An outdoor power tool includes a power head having a power head housing, a power source, a motor powered by the power source, and a drive shaft extending from the motor and rotatably driven by the motor. The power source and the motor are disposed within the power head housing, and the drive shaft extends from the power head housing. The outdoor power tool further includes a blower attachment having a blower housing having an air inlet, an air outlet, and a fan assembly. The drive shaft extends into the blower housing and is configured to drive rotation of the fan assembly.

The outdoor power tool of any one or more of the embodiments, wherein the fan assembly comprises a three-stage fan comprising three axial fans and three stator fans.

The outdoor power tool of any one or more of the embodiments, wherein the fan assembly has a diameter less than about 140 mm.

The outdoor power tool of any one or more of the embodiments, wherein the blower is removably coupled to the drive shaft.

The outdoor power tool of any one or more of the embodiments, further comprising at least one additional tool attachment configured to be removably coupled with the drive shaft, wherein the additional tool attachment is selected from the group consisting of a string trimmer, a pole saw, a hedge trimmer, an edger, a brush cutter, a brush, and a broom.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A blower comprising:

an air inlet;

an air outlet; and a fan assembly disposed between the air inlet and the air outlet, wherein the fan assembly comprises a three-stage fan, wherein the three-stage fan comprises three axial fans mounted on a drive shaft and three stator fans arranged in series with the axial fans, wherein each axial fan and each stator fan comprises an inlet side and an outlet side, wherein the inlet side is disposed nearer to the air inlet than the outlet side, and wherein the outlet side is disposed nearer to the air outlet than the inlet side, wherein each axial fan comprises a plurality of blades each having a blade tip, and wherein the three-stage fan has a dimensionless flow coefficient Φ in a range from about 0.3 to 0.5 as calculated by the equation $$\Phi = \frac{q/(A)}{\omega R}$$

where q represents flow ($m^3/s$), A represents cross sectional area at the fan ($m^2$), ω represents speed (rad/s) and R represents fan tip radius (m) measured at a blade tip.

2. The blower of claim 1, wherein each stator fan comprises a stackable housing, wherein each of the stackable housings of the three stator fans are coupled together in series to form a blower housing, wherein the blower housing houses the three stator fans and the three axial fans.

3. The blower of claim 2, wherein the blower housing comprises a diameter less than about 140 mm.

4. The blower of claim 1, wherein each axial fan comprises a hub surrounding the drive shaft, wherein the hub comprises a diameter in a range from about 50 mm to about 75 mm.

5. The blower of claim 4, wherein each of the plurality of blades of each axial fan extends from the respective hub of each axial fan to each respective blade tip, wherein each axial fan comprises a maximum diameter in a range from about 100 mm to about 140 mm.

6. The blower of claim 5, wherein the maximum diameter of each axial fan is in a range from about 115 mm to about 125 mm.

7. The blower of claim 1, wherein each blade comprises a chord length from an inlet side of the blade to an outlet side of the blade in a range from about 30 mm to about 50 mm.

8. The blower of claim 7, wherein the chord length is in a range from about 35 mm to about 45 mm.

9. The blower of claim 4, further wherein a blade hub inlet angle at the hub is greater than a blade hub outlet angle of each blade at the hub.

10. The blower of claim 9, wherein the blade hub inlet angle is in a range from about 40 degrees to about 55 degrees.

11. The blower of claim 9, wherein the blade hub outlet angle is in a range from about 20 degrees to about 30 degrees.

12. The blower of claim 4, wherein a blade tip inlet angle at the inlet side of the blade tip is greater than a blade tip outlet angle at the outlet side of the blade tip.

13. The blower of claim 12, wherein the blade tip inlet angle is in a range from about 58 degrees to about 70 degrees.

14. The blower of claim 12, wherein the blade tip outlet angle is in a range from about 50 degrees to about 55 degrees.

15. An outdoor power tool comprising:

a power head comprising a power head housing, a power source, a motor powered by the power source, and a drive shaft extending from the motor and rotatably driven by the motor, wherein the power source and the motor are disposed within the power head housing and the drive shaft extends from the power head housing; and a blower attachment comprising the blower of claim 1.

16. The outdoor power tool of claim 15, wherein the fan assembly comprises a three-stage fan comprising three axial fans and three stator fans.

17. The outdoor power tool of claim 16, wherein the fan assembly has a diameter less than about 140 mm.

18. The outdoor power tool of claim 15, wherein the blower is removably coupled to the drive shaft.

19. The outdoor power tool of claim 18, further comprising at least one additional tool attachment configured to be removably coupled with the drive shaft, wherein the additional tool attachment is selected from the group consisting of a string trimmer, a pole saw, a hedge trimmer, an edger, a brush cutter, a brush, and a broom.

* * * * *